(12) United States Patent
Tsukada et al.

(10) Patent No.: US 7,694,792 B2
(45) Date of Patent: Apr. 13, 2010

(54) TWIN CLUTCH DEVICE

(75) Inventors: Yoshiaki Tsukada, Saitama (JP); Toshimasa Mitsubori, Saitama (JP); Masahiro Kuroki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 621 days.

(21) Appl. No.: 11/642,657

(22) Filed: Dec. 21, 2006

(65) Prior Publication Data
US 2007/0144857 A1 Jun. 28, 2007

(30) Foreign Application Priority Data

| Dec. 28, 2005 | (JP) | ............................. 2005-377451 |
| Dec. 28, 2005 | (JP) | ............................. 2005-377452 |
| Dec. 28, 2005 | (JP) | ............................. 2005-377453 |

(51) Int. Cl.
*F16D 21/02* (2006.01)
(52) U.S. Cl. ................................ 192/48.91; 192/89.21
(58) Field of Classification Search ................ 192/48.9, 192/48.91, 90, 89.21
See application file for complete search history.

(56) References Cited

U.S. PATENT DOCUMENTS

| 3,179,220 | A | * | 4/1965 | Sink ........................... 192/48.9 |
| 3,181,668 | A | * | 5/1965 | Sink ........................... 192/48.9 |
| 3,212,611 | A | * | 10/1965 | Ruoff et al. ................. 192/48.8 |
| 4,613,026 | A | * | 9/1986 | Ohzono et al. ........... 192/85 AA |
| 4,732,253 | A | * | 3/1988 | Hiramatsu et al. ........ 192/87.11 |
| 6,508,094 | B1 |  | 1/2003 | Gotou et al. |
| 2005/0139442 | A1 |  | 6/2005 | Agner et al. |
| 2006/0266612 | A1 | * | 11/2006 | Gerlach .................... 192/48.91 |

FOREIGN PATENT DOCUMENTS

| CN |  | 1637310 A | 7/2005 |
| DE |  | 3446460 A1 | 7/1986 |
| DE |  | 4332466 A1 | 3/1995 |
| DE |  | 10301405 A1 | 7/2004 |
| EP |  | 1400715 A1 | 3/2004 |
| EP |  | 1 548 313 A2 | 6/2005 |
| WO | WO-2005/119076 A1 | | 12/2005 |

* cited by examiner

*Primary Examiner*—Sherry Estremsky
(74) *Attorney, Agent, or Firm*—Birch, Stewart, Kolasch & Birch, LLP

(57) ABSTRACT

A twin clutch device wherein a second clutch is arranged coaxially and radially inside of a first clutch outer which forms an annular plate portion. One clutch inners of both clutches is arranged between a clutch member which constitutes a portion of the outer of the first and second clutches and an annular plate portion. Lifter pins have axes arranged parallel to a rotary axis of first and second clutches and axially movably penetrate both clutch inners to bring one ends thereof into contact with pressure plates. First and second drive control members are capable of applying control forces to disconnect the first and second clutches against spring forces of first and second clutch springs. A second clutch outer is rotated together with the first clutch outer and is arranged coaxially with the first clutch. A pair of clutch outers are connected in a relatively non-rotatable manner with each other.

10 Claims, 9 Drawing Sheets

TWIN CLUTCH DEVICE

CROSS-REFERENCE TO RELATED APPLICATIONS

The present application claims priority under 35 USC 119 to Japanese Patent Application Nos. 2005-377451, 2005-377452 and 2005-377453 all filed on Dec. 28, 2005 the entire contents of which are hereby incorporated by reference.

BACKGROUND OF THE INVENTION

1. Field of the Invention

A twin clutch device includes a first clutch of a multiple disc type which includes a first clutch outer formed in a bottomed cylindrical shape while having an annular plate portion on one end thereof that is rotated due to power transmitted from a power source. A second clutch of a multiple disc type includes a second clutch outer which is rotated together with the first clutch outer and is coaxially arranged inside the first clutch in the radial direction. One of the clutch inners, which are respectively provided to the first and second clutches, is arranged between a clutch constituting member which constitutes a portion of the outer of the first and second clutches and the annular plate portion in a state wherein the clutch constituting member is relatively rotatable with respect to the clutch inner. The present invention relates to a twin clutch device which includes a first clutch for obtaining a connection state by a spring force of a first clutch spring, and a second clutch which is arranged coaxially with the first clutch and obtains a connection state by a spring force of a second clutch spring. The present invention also relates to a twin clutch device which includes a first clutch of a multiple disc type which has a cylindrical portion and a first clutch outer which is rotated due to the power transmitted from a power source. A second clutch of a multiple disc type is provided which includes a second clutch outer which is rotated together with the first clutch outer and is arranged coaxially with the first clutch.

2. Description of Background Art

A twin clutch device in which a second clutch is coaxially arranged radially inside a first clutch which includes a bottomed cylindrical clutch outer having an annular plate portion mounted on one end thereof with a clutch inner of the second clutch being arranged between a clutch inner of the first clutch and the annular plate portion is disclosed in German Patent No. 4332466.

However, in the twin clutch device disclosed in German Patent No. 4332466, the first clutch and the second clutch are brought into a connection state by applying an external force. Thus, in providing the twin clutch device to a gear transmission, it is necessary to constantly apply the external force to the twin clutch device whereby the device is undesirable. In view of the above, it is desirable to provide a construction wherein the first clutch and the second clutch are brought into a disconnection state when the external force is applied. However, since the clutch inner of the second clutch is configured to be arranged between the annular plate portion of the clutch outer provided to the first clutch and the clutch inner of the first clutch, it is difficult to simply constitute the structure which can bring the first clutch and the second clutch into a disconnection state by applying the external force.

A twin clutch device is known for applying a control force for changing over a disconnection/connection state to first and second clutches which are arranged coaxially together with electrically-operated motors that are provided that individually correspond to the first and second clutches as disclosed in Patent Document EP-A-1400715.

However, in the twin clutch device disclosed in EP-A-1400715, it is necessary to provide the pair of electrically-operated motors which individually correspond to the first and second clutches. Thus, in addition to an increase in the number of parts, the structure becomes complicated. In addition, a manufacturing cost is increased and the twin clutch device becomes large-sized.

A twin clutch device is known which is configured to coaxially connect clutch outers of first and second clutches using bolts. See, for example, JP-A-61-153023.

However, in the structure which fastens both clutch outers using bolts as in the case of the twin clutch device disclosed in JP-A-61-153023, an outer circumferential diameter of the clutch outer is increased due to the bolt injector fastening thus leading not only to a large-sizing of the twin clutch device but also an increase in the number of parts and an increase in the number of man-hours for assembling.

SUMMARY AND OBJECTS OF THE INVENTION

The present invention has been made under such circumstances and it is an object of the invention to provide a twin clutch device which can simplify the structure for bringing both clutches into a disconnected state by applying an external force.

To achieve the above-mentioned object, an embodiment of the present invention is directed to a twin clutch device which includes a first clutch of a multiple disc type with a first clutch outer that is formed in a bottomed cylindrical shape while having an annular plate portion on one end thereof and is rotated due to power transmitted from a power source. A second clutch of a multiple disc type includes a second clutch outer which is rotated together with the first clutch outer and is coaxially arranged inside the first clutch in the radial direction. One of the clutch inners which are respectively provided to the first and second clutches is arranged between a clutch constituting member which constitutes a portion of the outer of the first and second clutches and the annular plate portion in a state wherein the clutch constituting member is relatively rotatable with respect to the clutch inner. Ring-like pressure plates, provided for changing over the first and second clutches between a disconnected state and a connected state, are respectively supported on annular-plate-portion-side end portions of both clutch inners in a state that the pressure plates are operable in the axial direction. At the same time, clutch springs, for biasing the pressure plates to a connected side, are respectively arranged on the annular-plate-portion-side end portions. One end of lifter pins which have axes thereof arranged parallel to a rotational axis of the first and second clutches and respectively penetrate both clutch inners in an axially movable manner are respectively brought into contact with the pressure plates in a state wherein the ends of the lifter pins are capable of pushing the pressure plates against a spring biasing force of the clutch springs. One end of a drive pin, which has an axis thereof arranged parallel to the rotational axis of the first and second clutches and penetrates the clutch constituting member in an axially movable manner, is connected to the other end of the lifter pin which penetrates one clutch inner out of both lifter pins by way of a thrust bearing means.

Further, an embodiment of the present invention provides annular spring seats that are respectively interposed between both clutch springs and both pressure plates.

Further, an embodiment of the present invention provides a clutch disconnection/connection control means which includes a cam shaft rotatable about an axis orthogonal to the rotational axis of the first and second clutches and on which cams that individually correspond to the first and second clutches are mounted is interlockingly connected to the other end of the lifter pin which penetrates the other of both clutch inners and to the other end of the drive pin. Thus, the clutch disconnection/connection means is allowed to push and drive the lifter pin which penetrates the other clutch inner and the drive pin independently from each other and corresponding to a rotational position of the cam shaft.

Here, a second clutch outer 37 of a first embodiment corresponds to the clutch constituting member of the present invention. In addition, a thrust bearing corresponds to the thrust bearing means of the invention.

According to an embodiment of the present invention, by axially pushing the lifter pins which respectively penetrate the clutch inners of the first and second clutches by applying the external force to the lifter pins, it is possible to bring the first and second clutches into a disconnected state. Further, while one side clutch inner is arranged between the annular plate portion of the first clutch outer and the clutch constituting member, the clutch constituting member is relatively rotatable with respect to one clutch inner, and one end of the drive pin which axially movably penetrates the clutch constituting member is connected to the other end of the lifter pin which penetrates one clutch inner by way of the thrust bearing means. Accordingly, irrespective of the relative rotation between one clutch inner and the clutch constituting member, it is possible to axially drive the lifter pin which penetrates one clutch inner. Due to the simple construction in which the thrust bearing means is interposed between the lifter pin and the drive pin, it is possible to bring the clutch which includes one clutch inner into the disconnected state by applying an external force. Further, since the operating directions and driving directions of both lifters are the same, the structure which applies the driving force for connecting or disconnecting the first clutch and the second clutch to both lifter pins can be realized in a simple form.

Further, according to an embodiment of the present invention, the clutch spring is brought into contact with the pressure plate by way of the annular spring seat. Thus, it is possible to uniformly apply the spring force of the clutch spring to the whole periphery of the pressure plate thus ensuring a reliable disconnection and connection of the first clutch and the second clutch.

Further, according to an embodiment of the present invention, it is possible to perform the change over of both clutches between the disconnection state and the connection state independently from each other using the clutch disconnection/connection control means common to the first and the second clutch. Thus, the structure which applies the external force for changing over the first and the second clutches between the disconnection state and the connection state is simplified.

An embodiment of the present invention provides a twin clutch device which can reduce the number of parts, can simplify the structure, can reduce the manufacturing cost, and can miniaturize the twin clutch device.

To achieve the above-mentioned object, an embodiment of the present invention is directed to a twin clutch device which includes a first clutch for obtaining a connection state by a spring force of a first clutch spring, and a second clutch which is arranged coaxially with the first clutch and obtains a connection state by a spring force of a second clutch spring. A single cam shaft is provided in common for the first and second clutches that is rotatably arranged about an axis orthogonal to a rotary axis of both clutches. An actuator rotatably drives the cam shaft and is connected to the cam shaft. First and second drive control members are configured to apply control forces in the direction to disconnect the first and second clutches against the spring forces of the first and second clutch springs. The first and second clutches respectively follow first and second cams which are mounted on the cam shaft corresponding to the first and second clutches and interlockingly connected to the first and second cams.

Further, according to an embodiment of the present invention the actuator is constructed of a single electrically-operated motor and a speed reduction mechanism which transmits an output of the electrically operated motor to the cam shaft with a speed reduction.

A first lifter pin 65 of an embodiment corresponds to the first drive control member of the present invention, and a second lifter pin 66 of the embodiment corresponds to the second drive control member of the invention.

According to an embodiment of the present invention, it is possible to change over the disconnection/connection of both clutches independently from each other and individually with the single cam shaft used in common by the first and second clutches. Thus, it is sufficient to prepare one actuator which rotatably drives the cam shaft whereby the number of parts can be reduced, the structure can be simplified, the manufacturing cost can be reduced, and the twin clutch device can be miniaturized.

Further, according to an embodiment of the present invention, it is possible to provide the actuator which has a light-weighted and compact construction.

According to an embodiment of the present invention a twin clutch device is provided which can connect a pair of clutch outers in a relatively non-rotatable manner while reducing the number of parts and man-hours for assembling and, at the same time, miniaturizing the twin clutch device.

To achieve the above-mentioned object, an embodiment of the present invention is directed to a twin clutch device which includes a first clutch of a multiple disc type which has a cylindrical portion and a first clutch outer which is rotated due to the power transmitted from a power source. A second clutch of a multiple disc type is provided which has a second clutch outer which is rotated together with the first clutch outer and is arranged coaxially with the first clutch. The first clutch outer is arranged radially outwardly with respect to the second clutch and has an annular plate portion thereof integrally and contiguously formed with one end of the cylindrical portion. A plurality of clutch disc engaging grooves allows outer peripheries of a plurality of clutch discs provided to the first clutch to be relatively non-rotatably engaged therewith. A plurality of clutch outer engaging grooves are formed in the cylindrical portion which are arranged between the respective clutch disc engaging grooves in a state wherein the plurality of clutch outer engaging grooves allows an outer periphery of the second clutch outer to be engaged therewith in a relatively non-rotatable manner.

Further, according to an embodiment of the present invention the second clutch outer is arranged at a position where the second clutch outer sandwiches a first clutch inner which the first clutch includes with the annular plate portion. A retainer ring is brought into contact with and is engaged with an outer periphery of the second clutch outer from the axially outside and is mounted on the first clutch outer.

Further, according to an embodiment of the present invention an axial length of the clutch disc engaging grooves and an axial length of the clutch outer engaging grooves differ from each other.

Further, according to an embodiment of the present invention the clutch disc engaging grooves and the clutch outer engaging grooves are formed in the cylindrical portion in a circumferentially spaced-apart manner in a state wherein the clutch disc engaging grooves and the clutch outer engaging grooves open at the other end of the cylindrical portion (36a) opposite to the annular plate portion.

According to an embodiment of the present invention, the outer peripheries of the plurality of clutch discs which the first clutch includes are relatively non-rotatably engaged with the cylindrical portion of the first clutch outer and, at the same time, the outer periphery of the second clutch outer is relatively non-rotatably engaged with the cylindrical portion of the first clutch outer. Thus, in connecting the first and second clutch outers in a relatively non-rotatable manner, it is possible to prevent circumferential diameters of the first and second clutch outers from becoming large in size. Thus, the twin clutch device can be miniaturized. Further, the number of parts can be reduced and, at the same time, the number of man-hours for assembling can be reduced thus facilitating the assembling of the twin clutch device.

Further, according to an embodiment of the present invention, it is possible to prevent the movement of the second clutch outer in the axially outward direction with respect to the first clutch outer with a simple construction.

Further, according to an embodiment of the present invention, the erroneous assembling of the plurality of clutch discs and the second clutch outer to the first clutch outer can be easily prevented thus also facilitating the assembling of the twin clutch device.

Further, according to an embodiment of the present invention, the assembling of the plurality of clutch discs and the second clutch outer to the first clutch outer can be further facilitated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a mode for carrying out the present invention is explained based on one embodiment of the invention shown in attached drawings.

Figure 1:
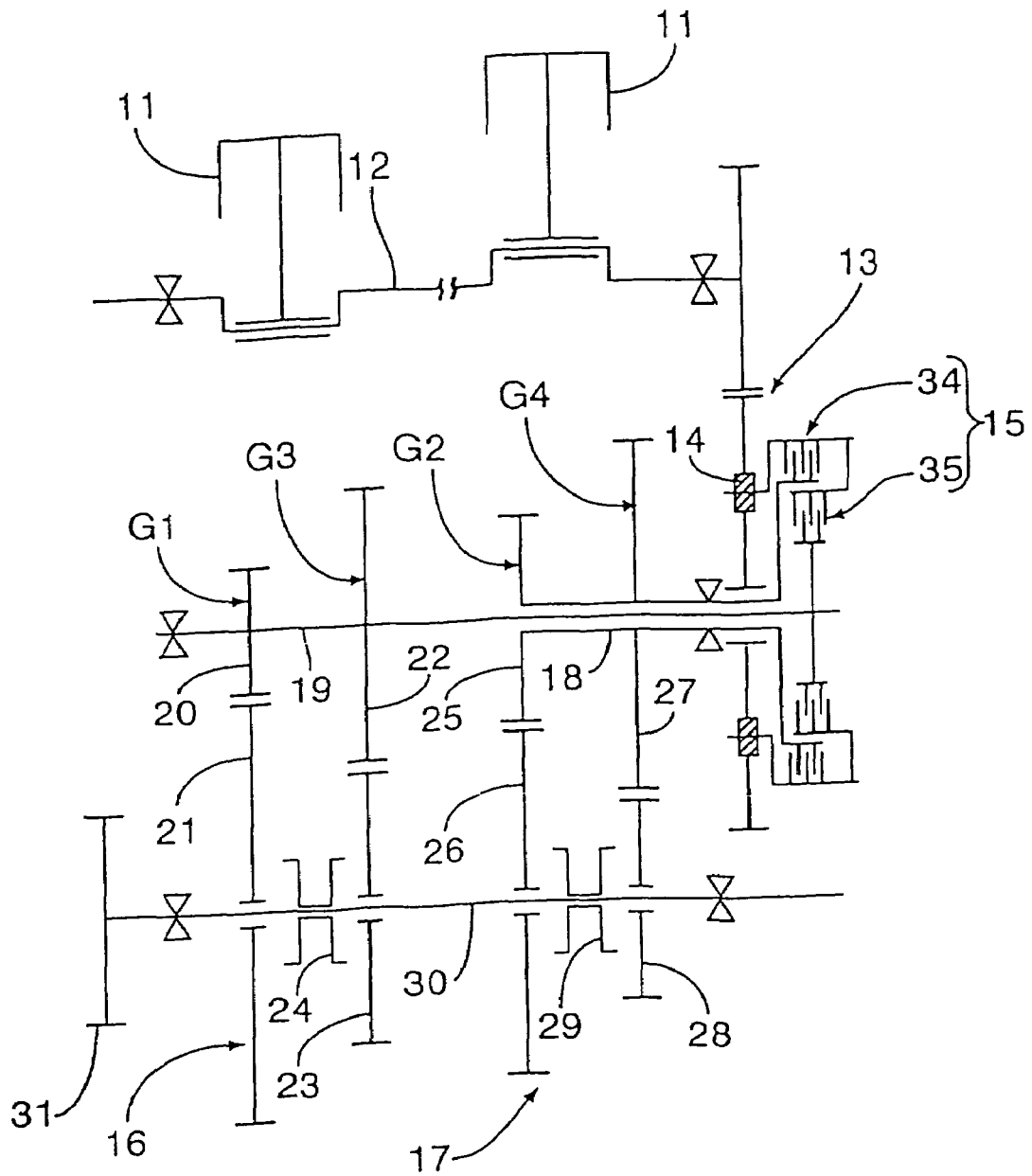
FIG. 1 is a view showing the schematic constitution of a twin clutch type gear transmission.

FIGS. 1 to 9(b) are views showing one embodiment of the present invention. As illustrated in FIG. 1, a plurality of pistons 11, 11, . . . are provided for a multiple cylinder engine that is mounted on, for example, a motorcycle. The pistons are connected to a crankshaft 12 which is rotatably supported on a crankcase not shown in the drawing in common. The rotational power of the crankshaft 12 is inputted to a twin clutch device 15 by way of a primary gear reduction device 13 and a damper rubber 14. On the other hand, inside of the crankcase, an odd-numbered-gear-change gear transmission mechanism 16 are accommodated, which includes odd-numbered gear-change gear trains, for example, first and third gear-change gear trains G1, G3 which can be selectively established, and an even-numbered-gear-change gear transmission mechanism 17, which includes even-numbered gear-change gear trains, for example, second and forth gear-change gear trains G2, G4 which can be selectively established. The transmission of the power to the odd-numbered-gear-change gear transmission mechanism 16 and the even-numbered-gear-change gear transmission mechanism 17 from the crankshaft 12 by way of a primary speed reduction device 13 and a damper rubber 14 . . . and the disconnection of such power transmission are changed over by the twin clutch device 15.

On the crankcase, a cylindrical first main shaft 18 is rotatably supported which has an axis arranged parallel to the crankshaft 12, a second main shaft 19 which coaxially penetrates the first main shaft 18 in a state wherein the second main shaft 19 is relatively rotatable with respect to the first main shaft 18 while being relatively arranged at a fixed position in the axial direction with respect to the first main shaft 18. In addition, a counter shaft 30 is provided which has an axis thereof arranged parallel to the first and second main shafts 18, 19. The even-numbered-gear-change gear transmission mechanism 17 is arranged between the first main shaft 18 and the counter shaft 30, while the odd-numbered-gear-change gear transmission mechanism 16 is arranged between the second main shaft 19 and the counter shaft 30. On an end portion of the counter shaft 30 which rotatably penetrates the crankcase, a drive sprocket wheel 31 is fixed such that a chain for transmitting the power to a rear wheel not shown in the drawing can be wound around the drive sprocket wheel 31.

The second-gear-change gear train G2 includes a second-speed drive gear 25 which is integrally formed with the first main shaft 18 and a second-speed driven gear 26 which is supported on the counter shaft 30 in a relatively rotatable manner with respect to the counter shaft 30 and is meshed with the second-speed drive gear 25. The fourth-gear-change gear train G4 includes a fourth-speed drive gear 27 which is fixed to the first main shaft 18 and a fourth-speed driven gear 28 which is supported on the counter shaft 30 in a relatively rotatable manner with respect to the counter shaft 30 and is meshed with the fourth-speed drive gear 27. Further, at a position between the second and fourth speed driven gears 26, 28, a second shifter 29 is connected to the counter shaft 30 by a spline engagement. Accordingly, due to the axial movement of the second shifter 29, it is possible to change over the gear change state between a state in which the second and fourth speed driven gear 26, 28 are allowed to be freely rotatable with respect to the counter shaft 30 (a neutral state) and a state in which either one of the second and fourth speed driven gears 26, 28 is joined to the counter shaft 30 in a relatively non-rotatable manner with respect to the counter shaft 30 thus establishing either one of the second-gear-change gear train G2 and the fourth-gear-change gear train G4.

The first-gear-change gear train G1 includes a first-speed drive gear 20 which is integrally formed with the second main shaft 19 and a first-speed driven gear 21 which is supported on the counter shaft 30 in a relatively rotatable manner with respect to the counter shaft 30 and is meshed with the first-speed drive gear 20. The third-gear-change gear train G3 includes a third-speed drive gear 22 which is fixed to the second main shaft 19 and a third-speed driven gear 23 which is supported on the counter shaft 30 in a relatively rotatable manner with respect to the counter shaft 30 and is meshed with the third-speed drive gear 22. Further, at a position between the first and third speed driven gears 21, 23, a first shifter 24 is connected to the counter shaft 30 by a spline engagement. Accordingly, due to the axial movement of the first shifter 24, it is possible to change over the gear change state between a state in which the first and third speed driven gears 21, 23 are allowed to be freely rotatable with respect to the counter shaft 30 (a neutral state) and a state in which either one of the first and third speed driven gears 21, 23 is joined to the counter shaft 30 in a relatively non-rotatable manner with respect to the counter shaft 30 thus establishing either one of the first-gear-change gear train G1 and the third-gear-change gear train G3.

Figure 2:
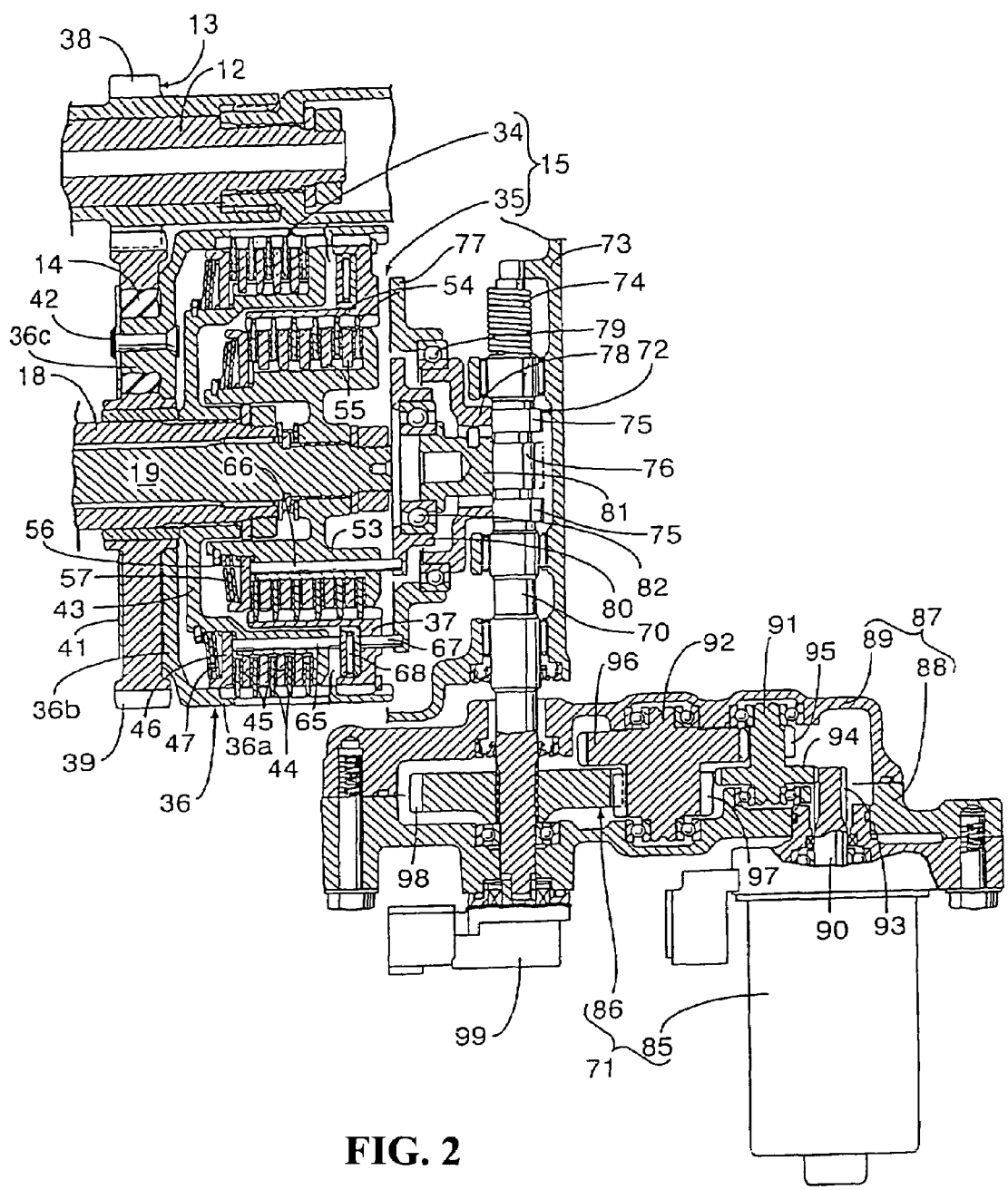
FIG. 2 is a longitudinal cross-sectional view of a twin clutch device.
Figure 3:
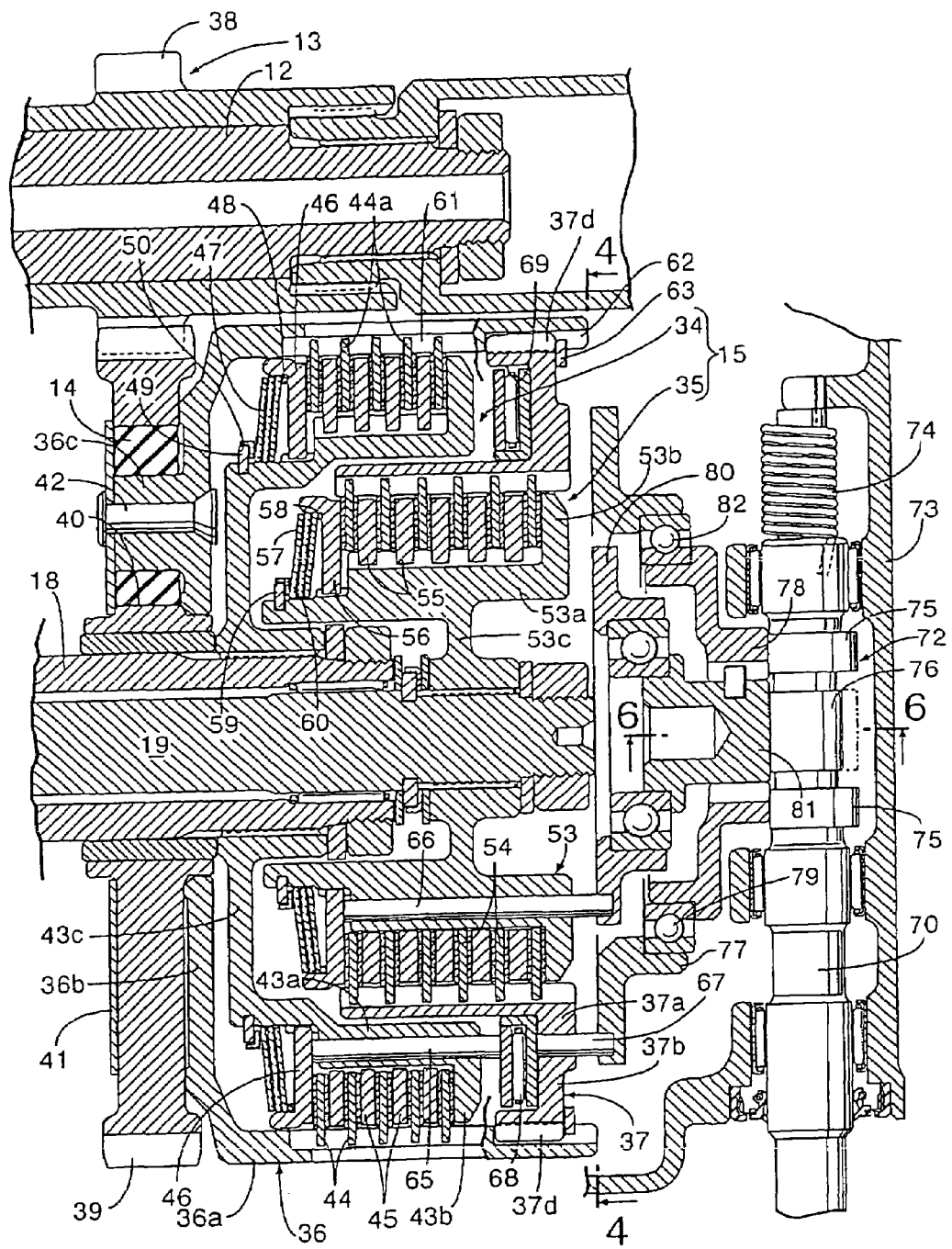
FIG. 3 is an enlarged view of an essential part in FIG. 2.

To explain this embodiment also in conjunction with FIGS. 2 and 3, the twin clutch device 15 has a first clutch 34 of a multiple disc type which includes a first clutch outer 36 which is rotated by power transmitted from the primary speed reduction device 13 for changing over the transmission of the power to the even-numbered-gear-change gear transmission mechanism 17 from the crankshaft 12 for the disconnection of such power transmission. A second clutch 35 of a multiple disc type includes a second clutch outer 37 which is rotated together with the first clutch outer 36 and is coaxially arranged inside the first clutch 34 in the radial direction. Thus, a change over of the transmission of the power to the odd-numbered-gear-change gear transmission mechanism 16 from the crankshaft 12 and the disconnection of such power transmission can occur. The first clutch outer 36 is formed in a bottomed cylindrical shape by integrally connecting an annular plate portion 36b to one end of a cylindrical portion 36a.

The primary speed reduction device 13 includes a drive gear 38 which is integrally formed with the crankshaft 12, and a driven gear 39 which is supported on the second main shaft 19 in a relatively rotatable manner with respect to the second main shaft 19 and is meshed with the drive gear 38. Further, connection bosses 36c . . . are integrally formed on a plurality of circumferential portions of the annular plate portion 36b of the first clutch outer 36 in a projecting manner. The connection bosses 36c . . . penetrate damper rubbers 14 . . . which are inserted into holding holes 40 . . . which are formed in the driven gear 39. A holding plate 41 is brought into contact with the driven gear 39 on a side opposite to the annular plate portion 36b and is fastened to end surfaces of the connection bosses 36c . . . using rivets 42 . . . which penetrate the connection bosses 39c . . . . That is, the power transmitted from the crankshaft 12 is inputted to the first clutch outer 36 by way of the primary speed reduction device 13 and the damper rubbers 14 . . . .

The first clutch 34 includes the above-mentioned first clutch outer 36, a first clutch inner 43 which has a cylindrical portion 43a coaxially surrounded by the cylindrical portion 36a of the first clutch outer 36, a plurality of first clutch discs 44 . . . which is engaged with the cylindrical portion 36a of the first clutch outer 36 in a relatively non-rotatable manner with respect to the cylindrical portion 36a, a plurality of first clutch plates 45 . . . which is engaged with the cylindrical portion 43a of the first clutch inner 43 in a relatively non-rotatable manner with respect to the cylindrical portion 43a and is arranged in an alternately overlapped manner with the first clutch discs 44 . . . . An annular first pressure receiving plate portion 43b which faces the first clutch discs 44 . . . , and the first clutch plates 45 . . . which are arranged in an alternately overlapped manner from a side opposite to the annular plate portion 36b, an annular first pressure plate 46 which faces the first clutch discs 44 . . . and the first clutch plates 45 . . . which are arranged in an alternately overlapped manner from an annular-plate-portion-36b side, and a first clutch spring 47 which exerts a spring force for biasing the first pressure plate 46 to a side where the first clutch discs 44 . . . and the first clutch plates 45 . . . are clamped between the first pressure plate 46 and the first pressure receiving plate portion 43b.

The first pressure receiving plate portion 43b integrally projects from an outer end of the cylindrical portion 43a of the first clutch inner 43 in the radially outward direction and is formed in an annular shape. Further, the first clutch inner 43 includes an annular connection plate portion 43c which integrally projects from an inner end of the cylindrical portion 43a in the radially inward direction. An inner periphery of the connection plate portion 43c is connected to the second main shaft 19 in a relatively non-rotatable manner and also in a relatively non-movable manner in the axial direction with respect to the second main shaft 19.

The first pressure plate 46 is supported on the cylindrical portion 43a of the first clutch inner 43 in a relatively non-rotatable manner and in a relatively movable manner in the axial direction with respect to the cylindrical portion 43a, while an outer periphery of the first clutch spring 47 which includes an overlapping of a plurality of disc springs is brought into contact with the first pressure plate 47 by way of an annular first spring seat 48. Further, an inner periphery of the first clutch spring 47 is brought into contact with and is supported on a retainer ring 49 which is mounted on an outer periphery of an inner end portion of the cylindrical portion 43a by way of an annular first retainer 50.

Figure 4:
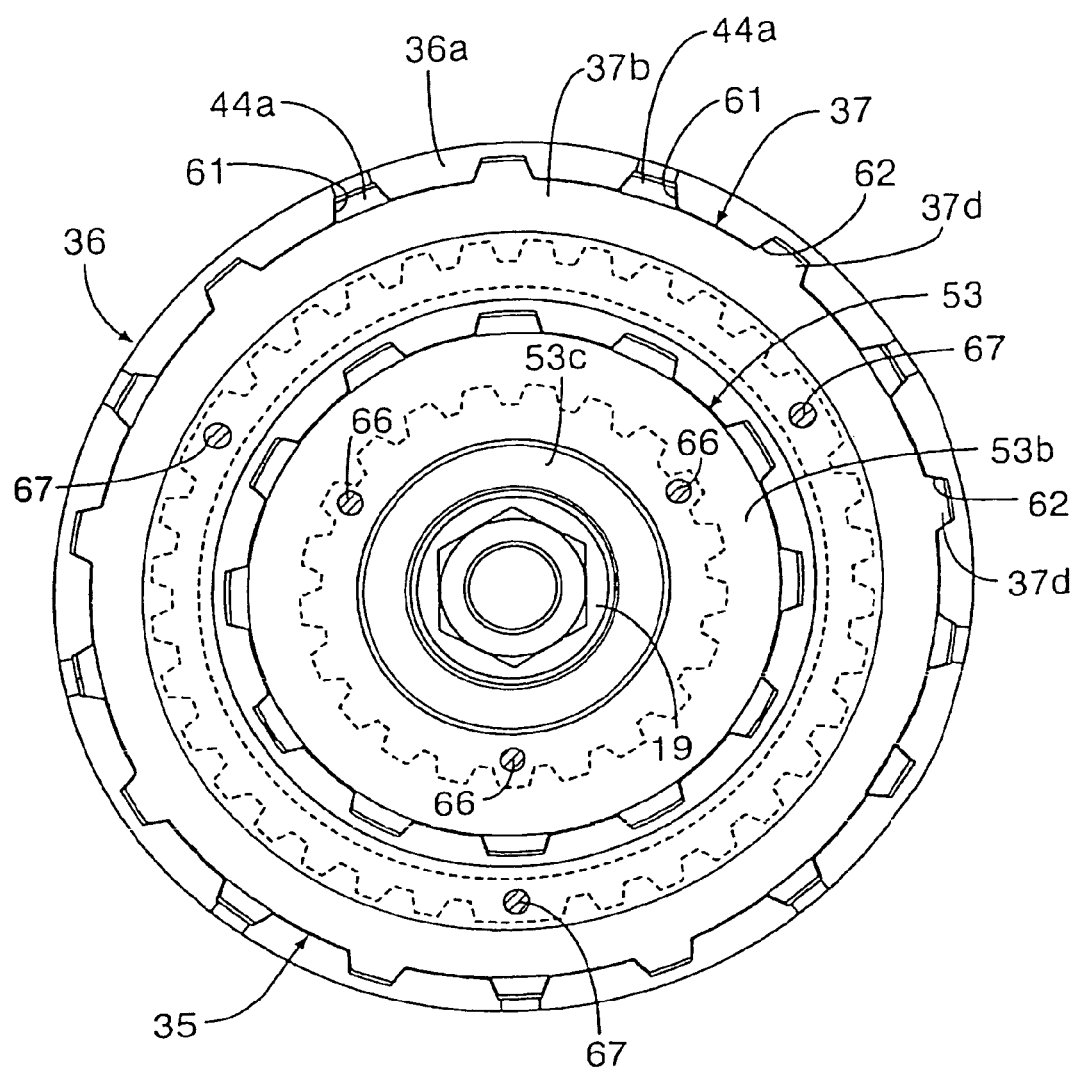
FIG. 4 is a cross-sectional view taken along a line 4-4 in FIG. 3.

To explain this embodiment also in conjunction with FIG. 4, the second clutch 35 includes the second clutch outer 37 which has a cylindrical portion 37a thereof coaxially surrounded by the cylindrical portion 36a of the first clutch outer 36 of the first clutch 34 and is rotated together with the first clutch outer 36, a second clutch inner 53 which has a cylindrical portion 53a thereof coaxially surrounded by the cylindrical portion 37a of the second clutch outer 37, a plurality of second clutch discs 54 . . . which is engaged with the cylindrical portion 37a of the second clutch outer 37 in a relatively non-rotatable manner with respect to the cylindrical portion 37a, a plurality of second clutch plates 55 . . . which is engaged with the cylindrical portion 53a of the second clutch inner 53 in a relatively non-rotatable manner with respect to the cylindrical portion 53a and is arranged in an alternately overlapped manner with the first clutch discs 54 . . . . In addition, an annular second pressure receiving plate portion 53b is provided which faces the second clutch discs 54 . . . and the second clutch plates 55 . . . which are arranged in an alternately overlapped manner from a side opposite to the annular plate portion 36b of the first clutch outer 36, an annular second pressure plate 56 which faces the second clutch discs 54 . . . and the second clutch plates 55 . . . which are arranged in an alternately overlapped manner from an annular-plate-portion-36b side, and a second clutch spring 57 which exerts a spring force for biasing the second pressure plate 56 to the side where the second clutch discs 54 . . . and the second clutch plates 55 are clamped between the second pressure plate 56 and the second pressure receiving plate portion 53b.

The second clutch outer 37 integrally includes an annular outer connecting plate portion 37b which projects in the radially outward direction from an outer end of the cylindrical portion 37a, and an annular inner connecting plate portion 37c which projects in the radially inward direction from an axially intermediate portion of the cylindrical portion 37a. Further, the outer connecting plate portion 37b covers the first clutch inner 43 from the outside such that the first clutch inner 43 is arranged between the annular plate portion 36b of the first clutch outer 36 and the outer connecting plate portion 37b and is integrally connected to an outer end of the cylindrical portion 37a. An outer periphery of the connecting plate portion 37b is engaged with the cylindrical portion 36a of the first clutch outer 36 in a relatively non-rotatable manner. Further, an inner periphery of the inner connecting plate portion 37c is connected to the end portion of the first main shaft 18 which projects from the second main shaft 19 in an axially relatively non-movable manner and a relatively non-rotatable manner.

Figure 5:
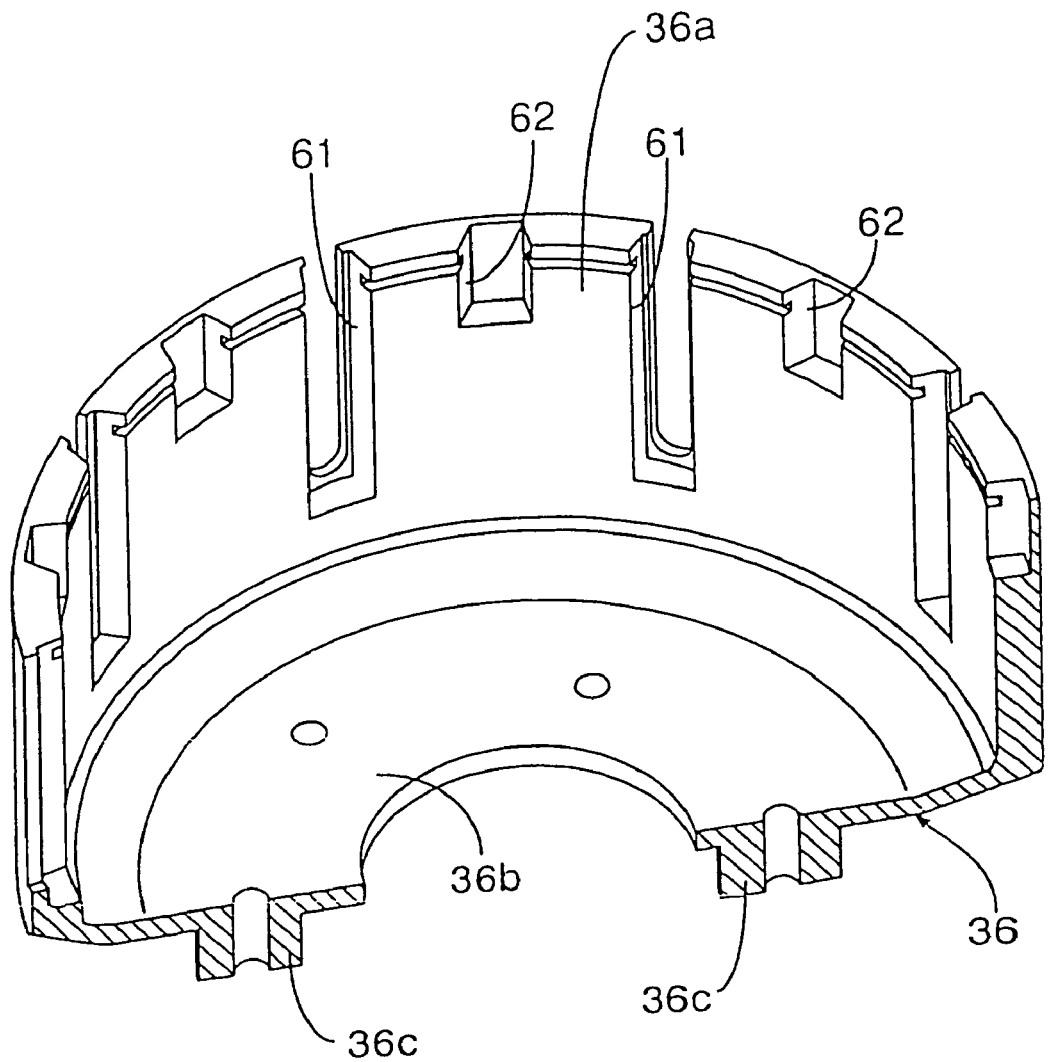
FIG. 5 is a perspective view with a part broken away of a first clutch outer.

Further, to explain this embodiment also in conjunction with FIG. 5, in the cylindrical portion 36a of the first clutch outer 36, a plurality of clutch disc engaging grooves 61, 61 . . . which allows the outer peripheries of the plurality of first clutch discs 54 . . . in the first clutch to be engaged therewith in a relatively non-rotatable manner is formed in the circumferential direction equidistantly and is opened at another end of the cylindrical portion 36a opposite to the annular plate portion 36b. Further, a plurality of clutch outer engaging grooves 62, 62 . . . that allows the outer periphery of the outer connecting plate portion 37b of the second clutch outer 37 to be engaged therewith in a relatively non-rotatable manner is formed in a circumferentially equidistant manner and is arranged between the respective clutch disc engaging grooves 61, 61 . . . and, at the same time, is respectively opened at another end of the cylindrical portion 36a. The respective clutch disc engaging grooves 61, 61 . . . are also opened on the outer peripheral surface of the cylindrical portion 36a.

Further, the axially inward movement of the second clutch outer 37 is prevented by a thrust bearing 68 described later, while a retainer ring 63 which is brought into contact with and is engaged with the outer periphery of the outer connecting plate portion 37b of the second clutch outer 37 from the axially outside is mounted on the cylindrical portion 36a of the first clutch outer 36.

On outer peripheries of the first clutch discs 44 . . . , engaging projections 44a . . . are formed in a projecting manner which are engaged with the respective clutch disc engaging grooves 61, 61 . . . . In addition, on an outer periphery of the outer connecting plate portion 37b of the second clutch outer 37, engaging projections 37d . . . are formed in a projecting manner which are engaged with the respective clutch outer engaging grooves 62, 62 . . . . An axial length of the clutch disc engaging grooves 61, 61 . . . and an axial length of the clutch outer engaging grooves 62, 62 . . . are set to be different from each other. In this embodiment, the connecting plate portion 37b of the second clutch outer 37 is arranged more axially outside than the first clutch discs 44. Thus, the axial length of the clutch disc engaging grooves 61, 61 . . . is set larger than the axial length of the clutch outer engaging grooves 62, 62 . . . .

A plurality of, for example, three first lifter pins 65 . . . are provided for applying a control force for driving toward the disconnection side against the spring force of the first clutch spring 47 to the first clutch 34 which maintains the connection state by the spring force of the first clutch spring 47. The first lifter pins 65 . . . have an axis thereof arranged parallel to the rotary axis of the first clutch 34 and axially movably penetrate a plurality of, for example, three portions of the cylindrical portions 43a of the first clutch inner 43 which are arranged circumferentially equidistantly, wherein one ends of these first lifter pins 65 . . . are brought into contact with the first pressure plate 46 of the first clutch 34 in a state that one end of the first lifter pins 65 . . . can push the first pressure plate 46 against the spring force of the first clutch spring 47.

A plurality of, for example, three second lifter pins 66 . . . are provided for applying a control force for driving toward the disconnection side against the spring force of the second clutch spring 57 to the second clutch 35 which maintains the connection state by the spring force of the second clutch spring 57. The second lifter pins 66 . . . have axes thereof arranged parallel to the rotary axis of the second clutch 35 and axially movably penetrate a plurality of, for example, three portions of the cylindrical portions 53a of the second clutch inner 53 which are arranged circumferentially equidistantly, wherein one end of the second lifter pins 66 . . . are brought into contact with the second pressure plate 56 of the second clutch 35 in a state wherein one end of the second lifter pins 66 . . . can push the second pressure plate 56 against the spring force of the second clutch spring 57.

Further, the second clutch outer 37 which forms a portion of the second clutch 35 sandwiches the first clutch inner 43 with the annular plate portion 36b of the first clutch outer 36. Drive pins 67 . . . which have axes thereof arranged parallel to the rotary axis of the first and second clutches 34, 35 axially movably penetrate a plurality of, for example, three portions of the outer connecting plate portion 37b of the second clutch outer 37 which are arranged in a circumferentially equidistant manner. One end of the drive pins 67 . . . are connected to one end of the first lifter pins 65 . . . by way of an annular thrust bearing 68.

Further, to prevent the movement of the thrust bearing 68 on a plane orthogonal to the axis of the first and second clutches 34, 35, an annular recessed portion 69, which accommodates and holds the thrust bearing 68, is formed in the outer connecting plate portion 37b.

To another end of the second lifter pins 66 . . . and another end of the drive pins 67 . . . , the clutch disconnection/connection control means 72 which has the cam shaft 70 which is rotatable about an axis orthogonal to the rotary axis of the first and second clutches 34, 35 and an actuator 71 which is connected to the cam shaft 70 so as to rotate the cam shaft 70 is interlockingly connected in a state wherein the clutch disconnection/connection control means 72 pushes and drives the second lifter pins 66 . . . and the drive pins 67 . . . independently from each other corresponding to the rotational position of the cam shaft 70.

The cam shaft 70 is rotatably supported on a cover 73 which is joined to a crankcase not shown in the drawing, and a restoring spring 74 is provided between the cam shaft 70 and the cover 73.

Figure 6:
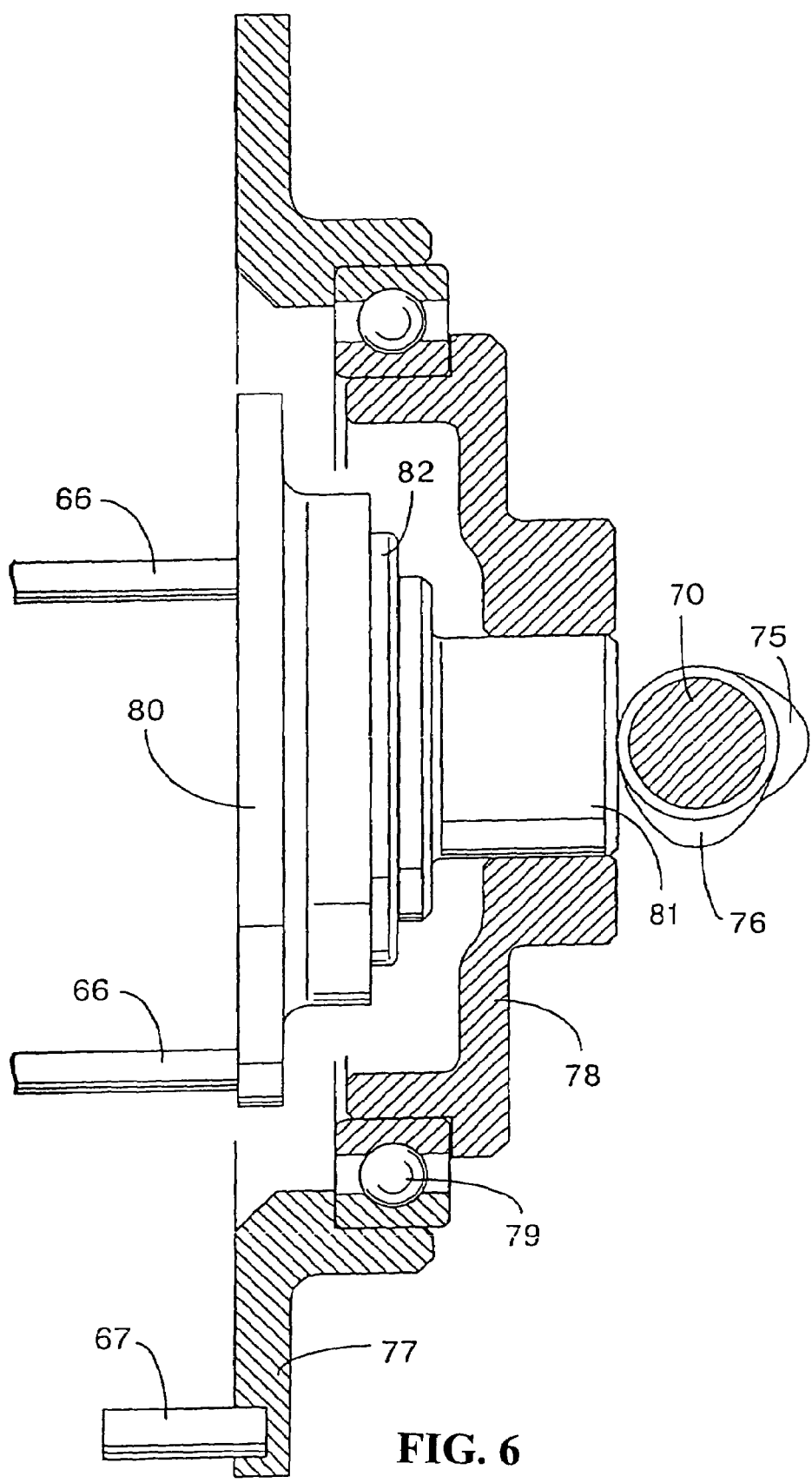
FIG. 6 is an enlarged cross-sectional view taken along a line 6-6 in FIG. 3.

To explain also in conjunction with FIG. 6, a pair of first cams 75, 75 which is arranged in an axially spaced-apart manner and a second cam 76 which is arranged at a center portion between both first cams 75 . . . are integrally formed with the cam shaft 70. The cam shaft 70 is supported on the cover 73 in a state wherein the second cam 76 is positioned on an axial extension of the first and second main shafts 18, 19.

Another end of the drive pins 67 . . . is connected to the annular first lifter 77 in common, and a first cam follower 78 has one end portion thereof connected to the first lifter 77 which is formed in a cylindrical shape and is brought into slidable contact with the first cams 75, 75 by way of a first release bearing 79. Further, another end of the second lifter pins 66 . . . is connected to an annular second lifter 80 which is coaxially surrounded by the first lifter 77 in common. In addition, a second cam follower 81 is connected to a second lifter 80 which is slidably fitted into the first lifter 77 by way of a second release bearing 82 in a state wherein the second lifter 81 brings one end thereof into slide contact with the second cam 76.

To explain by focusing on FIG. 2, the actuator 71 includes a single electrically-operated motor 85, and a speed reduction mechanism 86 which transmits an output of the electrically-operated motor 85 to the cam shaft 70 with a speed reduction. The electrically-operated motor 85, which performs the rotation parallel to the cam shaft 70, is mounted on a speed reduction mechanism casing 87 which is supported on the crankcase which houses the speed reduction mechanism 86 therein. The speed reduction mechanism casing 87 is formed by joining a pair of casing half bodies 88, 89 to each other, wherein the electrically-operated motor 85 is mounted on one casing half body 88 in a state wherein an output shaft 90 of the electrically-operated motor 85 projects into the inside of the speed reduction mechanism casing 87.

The speed reduction mechanism 86 is provided between the output shaft 90 of the electrically-operated motor 85 and the cam shaft 70 in the inside of the speed reduction mechanism casing 87. The speed reduction mechanism 86 includes a pinion 93 which is integrally formed with the output shaft 90, a first intermediate gear 94 which is integrally formed with a first intermediate shaft 91 which has an axis thereof arranged parallel to the output shaft 90 and the cam shaft 70 and is rotatably supported on the speed reduction mechanism casing 87 and is meshed with the pinion 93. A second intermediate gear 95 is integrally formed with the first intermediate shaft 91. A third intermediate gear 96 is integrally formed with a second intermediate shaft 92 which has an axis thereof arranged parallel to the output shaft 90 and the cam shaft 70 and is rotatably supported on the speed reduction mechanism casing 87 and is meshed with the second intermediate gear 95. A fourth intermediate gear 97 is integrally formed with the second intermediate shaft 92. In addition, a driven gear 98 is fixed to the cam shaft 70 and is meshed with the fourth intermediate gear 97.

Further, a potentiometer 99 which is coaxially connected to an end portion of the cam shaft 70 is mounted on the speed reduction mechanism casing 87, wherein a rotational angle of the cam shaft 70 is detected by the potentiometer 99.

Figure 7:
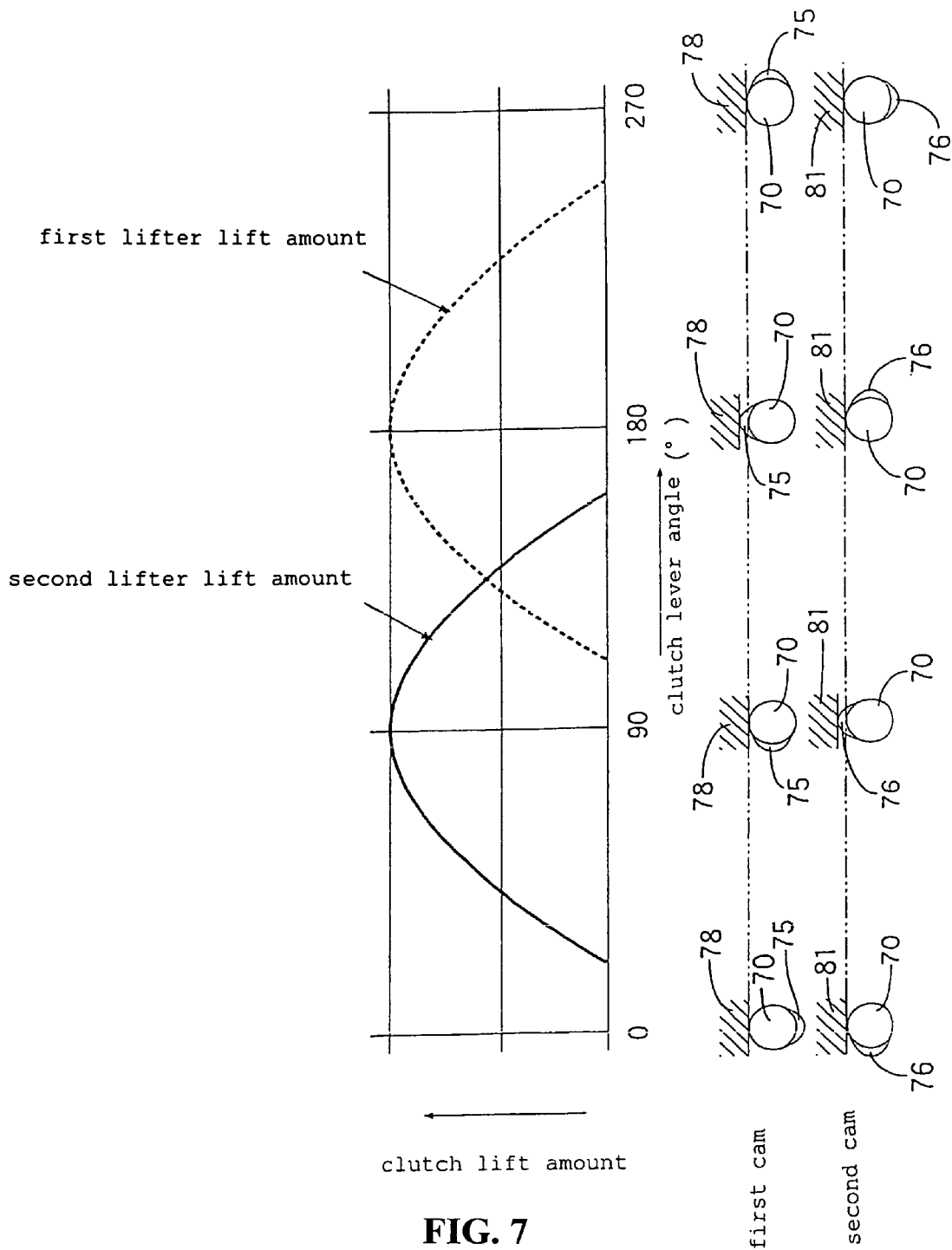
FIG. 7 is a view showing a rotational position of a cam shaft and a displacement of a lifter in comparison.

Here, the first cams 75 . . . and the second cam 76 are formed on the cam shaft 70 with a phase difference of 90 degrees, for example, therebetween, wherein the actuator 71 rotatably drives the cam shaft 70 such that the first cams 75 . . . and the second cam 76 are operated as shown in FIG. 7. More particularly, corresponding to the rotation of the cam shaft 70, a lift amount of the first lifter 78 corresponding to the first clutch 34 which changes over the disconnection and connection of the power transmission to the even-numbered-gear-change gear transmission mechanism 17 is changed as indicated by a broken line in FIG. 7, while a lift amount of the second lifter 81 corresponding to the second clutch 35 which changes over the disconnection and connection of the power transmission to the odd-numbered-gear-change gear transmission mechanism 16 is changed as indicated by a solid line in FIG. 7.

More specifically, the actuator 71 rotatably drives the cam shaft 70 to change over a gear-change state between a state in which either one of the first and second clutches 34, 35 is connected and the other is disconnected and a state in which both of the first and second clutches 34, 35 are connected.

The principle of the operation of the actuator 71 brings one of the first and second clutches 34, 35 into a connection state and the other into an disconnection state under a usual operational condition. Thus, a change-gear state attributed to either one of the even-numbered-gear-change gear train and the odd-numbered-gear-change gear train can be obtained using one of the even-numbered-gear-change gear transmission mechanism 17 and the odd-numbered-gear-change gear transmission mechanism 16. In the even-numbered-gear-change gear transmission mechanism 17 and the odd-numbered-gear-change gear transmission mechanism 16, at the time of changing over the gear change from the above-mentioned usual operation condition, one of the first and second shifters 29, 24 is operated so as to preliminarily establish the gear train of the next gear-change stage which follows depending on the gear change direction out of the first to fourth gear-change gear trains G1 to G4 in a state that the clutch which corresponds to the above-mentioned gear train of the next gear change stage out of both clutches 34, 35 is disconnected. Thereafter, the disconnection and the connection of both clutches 34, 35 are changed over due to the operation of the above-mentioned actuator 71.

For example, in performing the gear change from the first gear-change stage to the second gear-change stage, in a state wherein a speed change ratio of the first gear-change stage is obtained by establishing the first-gear-change gear train G1 of the odd-numbered-gear-change gear transmission mechanism 16 and by bringing the second clutch 35 into a connection state, the second-gear-change gear train G2 of the even-numbered-gear-change gear transmission mechanism 17 is established by bringing the first clutch 34 into a disconnected state. Thereafter, the second clutch 35 is disconnected and the first clutch 34 is connected.

Here, in performing the gear-change changeover between the even-numbered-gear-change stages or between the odd-numbered-gear-change stages, when the clutch corresponding to the gear transmission mechanism which becomes an object of changeover for establishing the gear train out of the even-numbered-gear-change gear transmission mechanism 17 and the odd-numbered-gear-change gear transmission mechanism 16 is held in a disconnected state, immediately before the completion of the changeover of the establishment of the gear train, the first main shaft 18 or the second main shaft 19 which is arranged at an input side of the gear transmission mechanism is rotated at a rotational speed before the changeover of the establishment of the gear train is performed. When the changeover of the establishment of the gear train is completed, the rotational speed of the first main shaft 18 or the second main shaft 19 is largely changed thus generating the transmission shock.

Figure 8A:
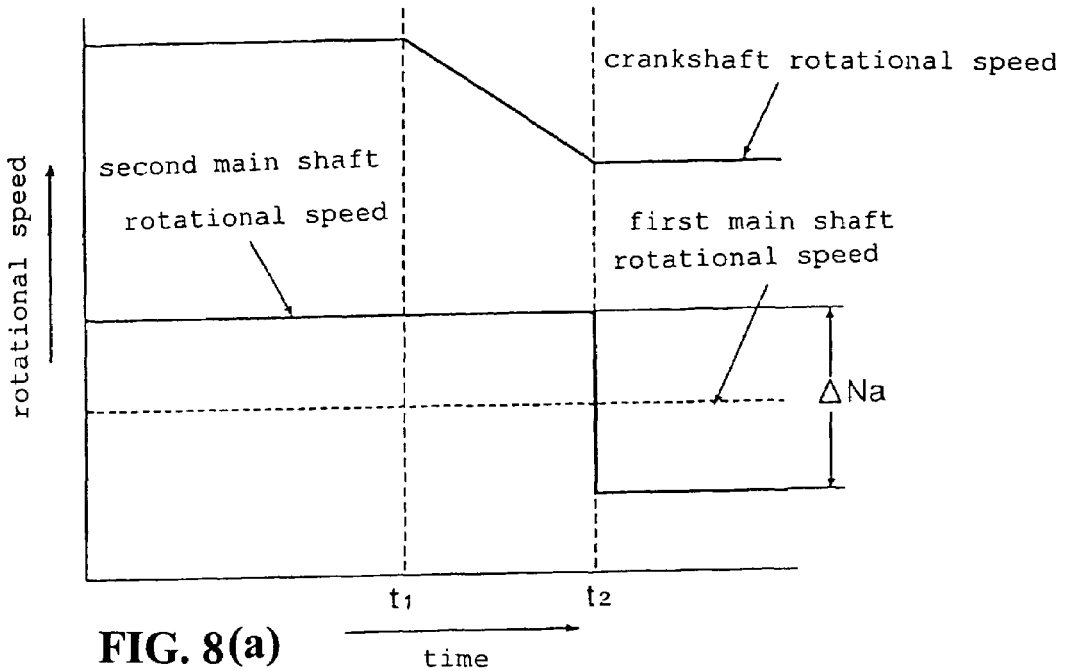
FIGS. 8(a) and 8(b) are views showing a gear change characteristic at the time of performing a shift-up operation.

For example, to consider the shift-up of the speed change ratio from the first gear-change stage to the third gear-change stage, at the time of operating the second shifter 24 from a state in which the first gear-change gear train G1 is established to a state in which the third gear-change gear train G3 is established in the odd-numbered-gear-change gear transmission mechanism 16, when the second clutch 35 is held in a disconnected state, the rotational speeds of the crankshaft 12, the first main shaft 18 and the second main shaft 19 are changed as shown in FIG. 8(a). More specifically, at a point in time t1 in a state wherein the speed change ratio of the first-gear-change stage is obtained by establishing the first-gear-change gear train G1 in the odd-numbered-gear-change gear transmission mechanism 16 and by establishing the second-gear-change-gear train G2 in the even-numbered-gear-change gear transmission mechanism 17 by disconnecting the first clutch 34 while connecting the second clutch 35, when the first clutch 34 is connected while disconnecting the second clutch 35, the second main shaft 19 is rotated at a rotational speed equal to the rotational speed before the point of time t1. In addition, when the third-gear-change gear train G3 is established in the odd-numbered-gear-change gear transmission mechanism 16 at a point in time t2 in such a state, the rotational speed of the second main shaft 19 is largely changed to the reduction side by ΔNa thus increasing the transmission shock.

Figure 9A:
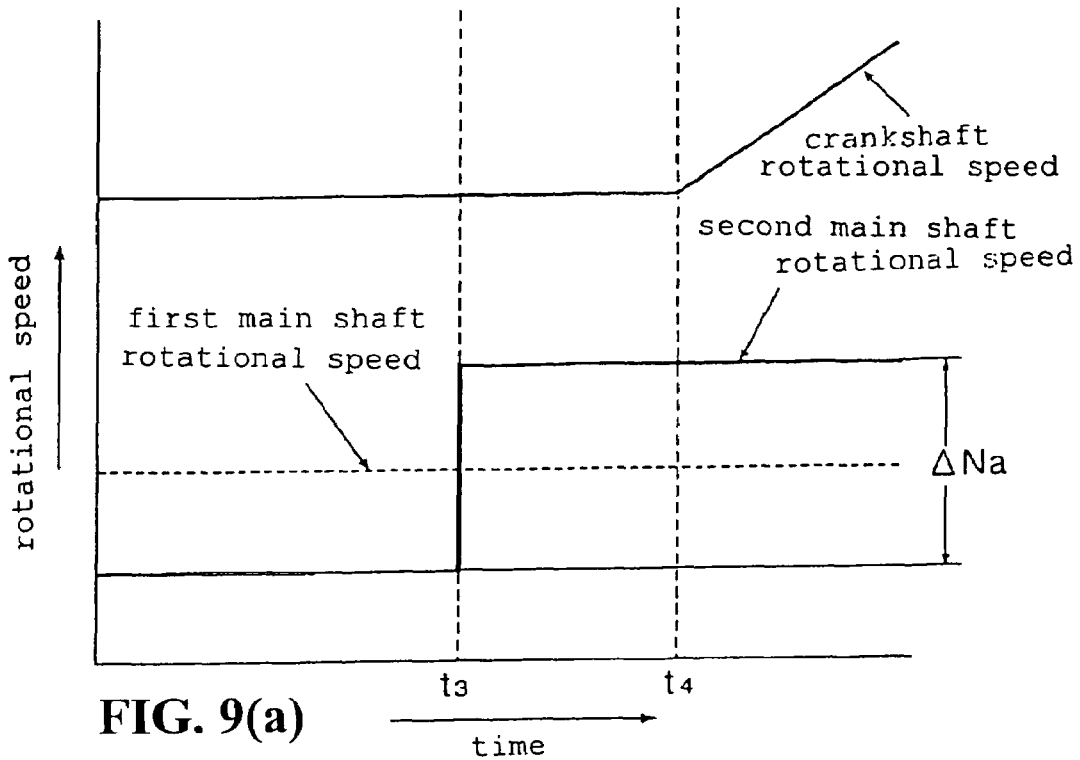
FIGS. 9(a) and 9(b) are views showing a gear change characteristic at the time of performing a shift-down operation.

Further, to consider the shift-down of the speed change ratio from the third gear-change stage to the first gear-change stage, at the time of operating the second shifter 24 from a state in which the third gear-change gear train G3 is established to a state in which the first gear-change gear train G1 is established in the odd-numbered-gear-change gear transmission mechanism 16, when the second clutch 35 is held in a disconnected state, the rotational speeds of the crankshaft 12, the first main shaft 18 and the second main shaft 19 are changed as shown in FIG. 9(a). More specifically, at a point in time t3 in a state wherein the speed change ratio of the second-gear-change stage is obtained by disconnecting the second clutch 35 while connecting the first clutch 34 by establishing the third-gear-change gear train G3 in the odd-numbered-gear-change gear transmission mechanism 16 and by establishing the second-gear-change gear train G2 in the even-numbered-gear-change gear transmission mechanism 17, the changeover of the established state from the third-gear-change gear train G3 to the first-gear-change gear train G1 in the odd-numbered-gear-change gear transmission mechanism 16 is started. Thereafter, at a point in time t4, when the second clutch 35 is connected and, at the same time, the first clutch 34 is disconnected, at the point of time t3 at which the establishment state of the speed change ratio is changed over from the third-gear-change gear train G3 to the first-gear-change gear train G1, the rotational speed of the second main shaft 19 is largely changed to the increase side by ΔNa thus increasing the transmission shock Accordingly, in performing the changeover of a change-gear ratio between the even-numbered gear-change stages or between the odd-numbered-gear-change stages, when one of the even-numbered-gear-change gear transmission mechanism 17 and the odd-numbered-gear-change gear transmission mechanism 16 assumes a neutral state in the midst of the changeover of the establishment of the gear train, a transmission control is performed such that the clutch corresponding to the gear transmission mechanism which becomes an object of changeover for establishment of the gear train out of the even-numbered-gear-change gear transmission mechanism 17 and the odd-numbered-gear-change gear transmission mechanism 16 is temporarily held in a connection state only for a short time from the disconnected state. In addition, after being disconnected again, the clutch is changed over from the disconnected state to a connection state after completion of the changeover for establishing the gear train.

Figure 8B:
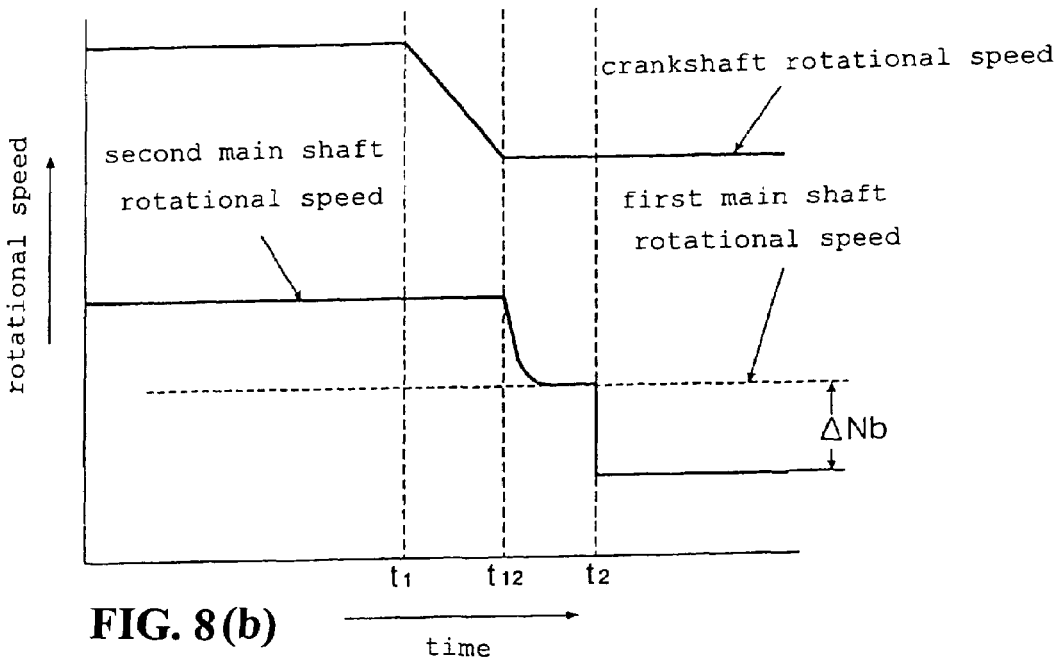

Accordingly, for example, to consider the shift-up of the speed change ratio from the first gear-change stage to the third gear-change stage, at the time of operating the second shifter 24 from a state in which the first gear-change gear train G1 is established to a state in which the third gear-change gear train G3 is established in the odd-numbered-gear-change gear transmission mechanism 16, when the second clutch 35 is temporarily held in a connection state only for a short time with the odd-numbered-gear-change gear transmission mechanism 16 in a neutral state, the rotational speeds of the crankshaft 12, the first main shaft 18 and the second main shaft 19 are changed as shown in FIG. 8(b). That is, at a point in time t1 in a state wherein the speed change ratio of the first-gear-change stage is obtained by establishing the first-gear-change gear train G1 in the odd-numbered-gear-change gear transmission mechanism 16 and by establishing the second-gear-change-gear train G2 in the even-numbered-gear-change gear transmission mechanism 17 by disconnecting the first clutch 34 while connecting the second clutch 35, the second clutch 35 is disconnected and, at the same time, the first clutch 34 is connected. Thereafter, at a point in time t12 in a state wherein the odd-numbered-gear-change gear transmission mechanism 16 assumes a neutral state in the midst of the changeover of the establishment of the gear train from the first-gear-change gear train G1 to the third-gear-change gear train G3, when the second clutch 35 is temporarily held in a connection state only for a short time (that is, both of the first and second clutches 34, 35 are temporarily held in connection state only for a short time), since the first clutch 34 is in a connection state and the second-gear-change gear train G2 of the even-numbered-gear-change gear transmission mechanism 17 is established, the rotational speed of the second main shaft 19 is lowered to the same level as the first main shaft 18. Further, a rotational-speed change amount of the second main shaft 19 when the third-gear-change-gear train G3 is established at the point in time t2 assumes a relatively small value ΔNb (<ΔNa) whereby the transmission shock can be alleviated.

Figure 9B:
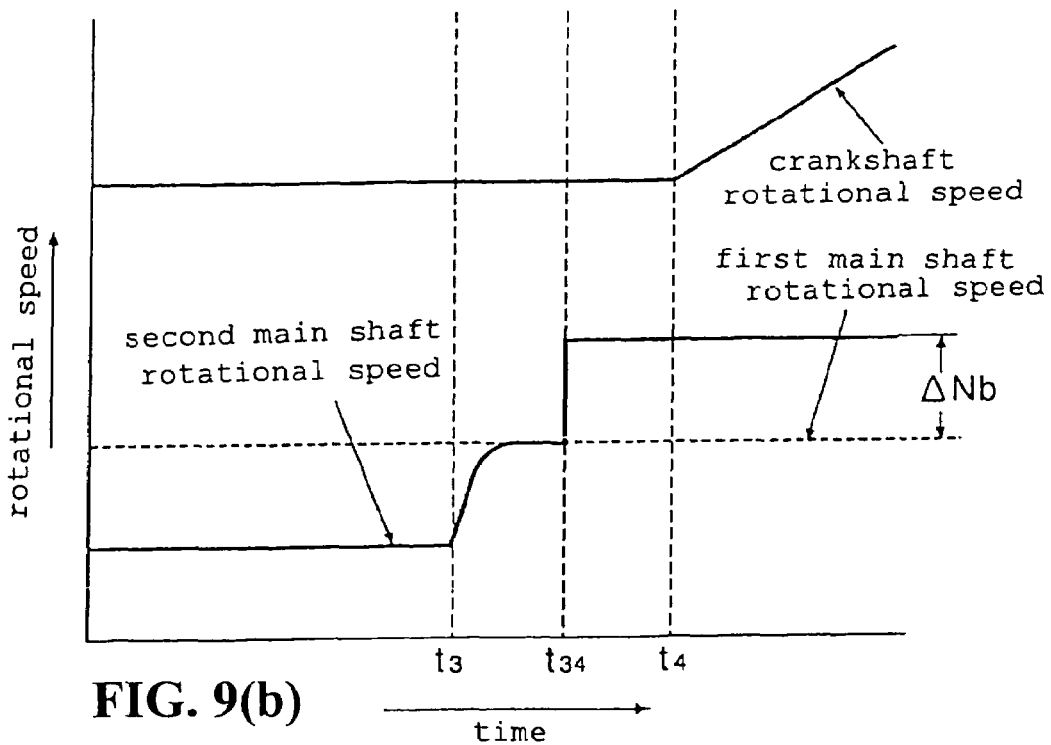

Further, for example, to consider the shift-down of the speed change ratio from the third gear-change stage to the first gear-change stage, at the time of operating the second shifter 24 from a state in which the third gear-change gear train G3 is established to a state in which the first gear-change gear train G1 is established in the odd-numbered-gear-change gear transmission mechanism 16, when the second clutch 35 is temporarily held in a connection state only for a short time with the odd-numbered-gear-change gear transmission mechanism 16 in a neutral state, the rotational speeds of the crankshaft 12, the first main shaft 18 and the second main shaft 19 are changed as shown in FIG. 9(b). That is, in a state wherein the speed change ratio of the second-gear-change stage is obtained by connecting the first clutch 34 and by disconnecting the second clutch 35 by establishing the third-gear-change gear train G3 in the odd-numbered-gear-change gear transmission mechanism 16 and by establishing the second-gear-change-gear train G2 in the even-numbered-gear-change gear transmission mechanism 17, at a point in time t3 in a state wherein the odd-numbered-gear-change gear transmission mechanism 16 assumes a neutral state at the time of changing over the establishment state of the gear train from the third-gear-change gear train G3 to the first-gear-change gear train G1, when the second clutch 35 is temporarily held in a connection state only for a short time (that is, both of the first and second clutches 34, 35 are temporarily held in connection state only for a short time), since the first clutch 34 is in a connection state and the second-gear-change gear train G2 of the even-numbered-gear-change gear transmission mechanism 17 is established, the rotational speed of the second main shaft 19 is increased to the same level as the rotational speed of the first main shaft 18. Further, a rotational-speed change amount of the second main shaft 19 when the first-gear-change-gear train G1 is established at the point in time t34 that assumes a relatively small value ΔNb (<ΔNa) whereby the transmission shock can be alleviated.

Next, the manner of operation of this embodiment is explained. In the twin clutch device 15 which includes the first clutch 34 having the first clutch outer 36 which has the annular plate portion 36b integrally and contiguously formed with one end of the cylindrical portion 36a, and the second clutch 35 which is coaxially arranged with the first clutch 34 radially inside the first clutch 34, the first and second pressure plates 46, 56 have a ring shape which changes over the disconnection and connection state of the first and second clutches 34, 35 that are respectively axially operably supported on the annular-plate-portion-36b-side end portions of the first and second clutch inners 43, 53 which are respectively provided to the first and second clutches 34, 35. Further, the first and second clutch springs 47, 57 which bias the pressure plates 46, 56 to the connection side are respectively arranged at the annular-plate-portion-36b-side end portions of the first and second clutch inners 43, 53. The first and second lifter pins 65, 66 which have axis thereof arranged parallel to the rotary axis of the first and second clutches 34, 35 and penetrate both clutch inners 43, 53 in an axially movable manner bring respective one ends thereof into contact with the pressure plates 46, 56 in a state that one ends can push the pressure plates 46, 56 against the spring biasing forces of the clutch springs 47, 57. Further, the drive pin 67 which has an axis thereof arranged parallel to the rotary axis of the first and second clutches 34, 35 and penetrates the outer connecting plate portion 37b of the second clutch outer 37 in an axially movable manner has one end thereof connected to another end of the first lifter pin 65 which penetrates the first clutch inner 43 out of both lifter pins 65, 66 by way of the thrust bearing 68.

Accordingly, by axially pushing the first and second lifter pins 65, 66 which respectively penetrate the first and second clutch inners 43, 53 by applying the external force to the first and second lifter pins 65, 66, it is possible to bring the first and second clutches 34, 35 into a disconnection state. Further, the first clutch inner 43 is arranged between the annular plate portion 36b of the first clutch outer 36 and the outer connecting plate portion 37b of the second clutch outer 37, while the second clutch outer 37 is relatively rotatable with respect to the first clutch inner 43. In addition, one end of the drive pin 67, which axially movably penetrates the outer connecting plate portion 37b, is connected to the other end of the first lifter pin 65 which penetrates the first clutch inner 43 by way of the thrust bearing 68. Accordingly, irrespective of the relative rotation between the first clutch inner 43 and the second clutch outer 37, it is possible to axially drive the first lifter pin 65. Due to the simple constitution in which the thrust bearing 68 is interposed between the first lifter pin 65 and the drive pin 67, it is possible to bring the first clutch 34 which includes the first clutch inner 43 into the disconnection state by applying the external force.

Further, since the operating directions and the driving directions of the first and second lifter pins 65, 66 are set equal to each other, it is possible to simplify the construction of the clutch disconnection/connection control means 72 for performing the disconnection/connection driving of the first and second clutches 34, 35.

Further, since the annular spring seats 48, 58 are respectively interposed between the first and second clutch springs 47, 57 and the first and second pressure plates 46, 56 it is possible to uniformly apply the spring forces of the first and second clutch springs 47, 57 to the whole peripheries of the pressure plates 46, 56 thus ensuring the reliable changeover of the disconnection/connection of the first and second clutches 34, 35.

Further, to another end of the second lifter pin 66 and the drive pin 67, the clutch disconnection/connection means 72 having the cam shaft 70 which is rotatable about an axis arranged orthogonal to the rotary axis of the first and second clutches 34, 35 and forms the first and second cams 75 . . . , 76 which individually correspond to the first and second clutches 34, 35 thereon is interlockingly connected in a state that the clutch disconnection/connection means 72 pushes and drives the second lifter pin 66 and the drive pin 67 independently from each other corresponding to the rotational position of the cam shaft 70. In this manner, it is possible to perform the changeover of the disconnection/connection of the first and second clutches 34, 35 independently from each other with the use of the clutch disconnection/connection control means 72 which is used in common by the first and second clutches 34, 35. Thus, it is possible to simplify the structure which applies an external force for changing over the disconnection/connection to the first and second clutches 34, 35.

Further, the cam shaft 70 is rotatably driven by the single actuator 71. Thus, it is sufficient to provide one actuator 71 for rotatably driving the cam shaft 70 whereby the number of parts can be reduced and, at the same time, the structure can be simplified. Further, the use of the single actuator 70 also leads to the reduction in the manufacturing cost and the miniaturization of the twin clutch device.

Further, the actuator 71 includes the single electrically-operated motor 85 and the speed reduction mechanism 86 which transmits the outputs of the electrically-operated motor 85 to the cam shaft 70 with speed reduction. Thus, the actuator 71 can have a light-weighted and compact constitution.

Here, the cylindrical portion 36a provided to the first clutch outer 35 of the first clutch 34 is provided with the plurality of clutch disc engaging grooves 61 . . . which allows the outer peripheries of the plurality of first clutch discs 44 . . . to be engaged therewith in a relatively non-rotatable manner and the plurality of clutch outer engaging grooves 62 . . . which are arranged between the respective clutch disc engaging grooves 61 . . . in a state that the outer periphery of the second clutch outer 37 provided to the second clutch outer 35 which is allowed to be engaged with the clutch outer engaging grooves 62 . . . in a relatively non-rotatable manner.

More specifically, the outer peripheries of the first clutch discs 44 . . . are engaged with the cylindrical portion 36a of the first clutch outer 36 in a relatively non-rotatable manner and, at the same time, the outer periphery of the second clutch outer 37 is engaged with the cylindrical portion 36a of the first clutch outer 36 in a relatively non-rotatable manner. Thus, in connecting the first and second clutch outers 36, 37 in a relatively non-rotatable manner, it is possible to prevent the diameters of the outer circumferences of the first and second clutch outers 36, 37 from being increased thus realizing the miniaturization of the twin clutch device 15. Further, due to such a construction, the number of parts can be reduced and, at the same time, man-hours for assembling can be reduced thus facilitating the assembling.

Further, the second clutch outer 37 is arranged at a position where the second clutch outer 37 sandwiches the first clutch inner 43 provided to the first clutch 34 with the annular plate portion 36b. The retainer ring 63 is brought into contact with and is engaged with the outer periphery of the second clutch outer 37 from the axially outside and is mounted on the cylindrical portion 36a. Thus, it is possible to prevent the axially outward movement of the second clutch outer 37 with respect to the first clutch outer 36 with a simple construction.

Further, the axial length of the clutch disc engaging grooves 61 ... and the axial length of the clutch outer engaging grooves 62 ... are set to be different from each other. Thus, it is possible to easily prevent the erroneous assembling of the first clutch discs 44 ... and the second clutch outer 37 to the first clutch outer 36 thus also facilitating the assembling.

Further, the plurality of clutch disc engaging grooves 61 ... and the plurality of clutch outer engaging grooves 62 ... are circumferentially equidistantly formed in another end of the cylindrical portion 36a opposite to the annular plate portion 36b of the first clutch outer 36 in a state wherein the engaging grooves 61 ..., 62 ... open at another end of the cylindrical portion 36a. Thus, the assembling of the plurality of first clutch discs 44 ... and the second clutch outer 37 to the first clutch outer 36 can be further facilitated.

Further, in the usual operating state, one of the first and second clutches 34, 35 is connected and the other is disconnected thus obtaining the gear change state attributed to one gear train of the even-numbered gear-change stage and the odd-numbered gear-change stage. Thus, it is possible to suppress a friction loss in the usual operating state.

Further, in performing the changeover of the transmission for changing the speed change ratio from the usual operational state, the gear train of the next gear-change stage which follows depending on the gear change direction out of the plurality of gear-change gear trains, that is, the first to fourth gear-change gear trains G1 to G4 is preliminarily establish in a state wherein the clutch which corresponds to the above-mentioned gear train is disconnected. Thereafter, the disconnection and the connection of both clutches 34, 35 are changed over. Thus, the transmission control attributed to the disconnection/connection control of both clutches 34, 35 can be facilitated and, at the same time, the transmission responsibility can be enhanced.

Further, in performing the changeover of change-gear ratio between the even-numbered gear-change stages or between the odd-numbered-gear-change stages, when one of the even-numbered-gear-change gear transmission mechanism 17 and the odd-numbered-gear-change gear transmission mechanism 16 assumes a neutral state in the midst of the changeover of the establishment of the gear train, the clutch corresponding to the gear transmission mechanism which becomes the object of changeover for establishment of the gear train out of the even-numbered-gear-change gear transmission mechanism 17 and the odd-numbered-gear-change gear transmission mechanism 16 is temporarily held in a connection state for a short time from the disconnected state. Further, after being disconnected again, the clutch is changed over from the disconnected state to a connection state after completion of the changeover for establishing the gear train. Accordingly, as has been explained in conjunction with the above-mentioned FIGS. 8(b) and 9(b), it is possible to alleviate the transmission shock when the changeover of the establishment of the gear train is completed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin clutch device comprising:
    a first clutch of a multiple disc type includes a first clutch outer formed in a bottomed cylindrical shape while having an annular plate portion on one end thereof and being rotated due to power transmitted from a power source; and
    a second clutch of a multiple disc type includes a second clutch outer rotated together with the first clutch outer and being coaxially arranged inside the first clutch in the radial direction;
    clutch inners respectively provided to the first and second clutches, at least one clutch inner being arranged between a clutch constituting member which constitutes a portion of the outer of the first and second clutches and the annular plate portion when the clutch constituting member is relatively rotatable with respect to the clutch inner;
    pressure plates for changing over the first and second clutches between disconnection state and connection state are respectively supported on annular-plate-portion-side end portions of both clutch inners when the pressure plates are operable in the axial direction and, at the same time, clutch springs for biasing the pressure plates to a connection side are respectively arranged on the annular-plate-portion-side end portions, one ends of lifter pins having axes thereof arranged parallel to a rotational axis of the first and second clutches respectively penetrate both clutch inners in an axially movable manner are respectively brought into contact with the pressure plates when one end of each of the lifter pins is capable of pushing the pressure plates against a spring biasing force of the clutch springs and one end of a drive pin having an axis thereof arranged parallel to the rotational axis of the first and second clutches and penetrating the clutch constituting member in an axially movable manner is connected to another end of one of the lifter pins which penetrates one clutch inner by way of a thrust bearing means.

2. The twin clutch device according to claim 1, wherein annular spring seats are respectively interposed between both clutch springs and both pressure plates.

3. The twin clutch device according to claim 2, wherein a clutch disconnection/connection control means includes a cam shaft rotatable about an axis orthogonal to the rotational axis of the first and second clutches and on which cams individually corresponding to the first and second clutches are mounted is interlockingly connected to the other end of the lifter pin which penetrates the other of both clutch inners and to the other end of the drive pin thus allowing the clutch disconnection/connection means to push and drive the lifter pin which penetrates the other clutch inner and the drive pin independently from each other corresponding to a rotational position of the cam shaft.

4. The twin clutch device according to claim 1, wherein a clutch disconnection/connection control means includes a cam shaft rotatable about an axis orthogonal to the rotational axis of the first and second clutches and on which cams individually corresponding to the first and second clutches are mounted is interlockingly connected to the other end of the lifter pin which penetrates the other of both clutch inners and to the other end of the drive pin thus allowing the clutch disconnection/connection means to push and drive the lifter pin which penetrates the other clutch inner and the drive pin independently from each other corresponding to a rotational position of the cam shaft.

5. The twin clutch device according to claim 1, wherein the thrust bearing prevents an axial inward movement of the second clutch outer.

6. The twin clutch device according to claim 5, and further including a retaining ring engaging an outer periphery of the second clutch outer, said retaining ring being mounted on a distal end of the first clutch outer.

7. The twin clutch device according to claim 1, wherein a plurality of lifter pins and a plurality of drive pins are arranged circumferentially around the clutch constituting member for selectively engaging the pressure plate of the second clutch.

8. The twin clutch device according to claim 1, wherein a plurality of lifter pins are arranged circumferentially around the clutch for selectively engaging the pressure plate of the first clutch.

9. A twin clutch device comprising:
- a first clutch for obtaining a connection state by a spring force of a first clutch spring;
- a second clutch arranged coaxially with the first clutch for obtaining a connection state by a spring force of a second clutch spring; and
- a single cam shaft provided in common for the first and second clutches, said single cam shaft being rotatably arranged about an axis orthogonal to a rotary axis of both clutches, an actuator rotatably driving the cam shaft, said actuator being connected to the cam shaft, first and second drive control members for applying control forces in the direction to disconnect the first and second clutches against the spring forces of the first and second clutch springs to the first and second clutches said first and second drive control members being interlockingly connected to first and second cams to respectfully follow the first and second cams mounted on the cam shaft corresponding to the first and second clutches.

10. The twin clutch device according to claim 9, wherein the actuator includes a single electrically-operated motor and a speed reduction mechanism for transmiting an output of the electrically operated motor to the cam shaft with a speed reduction.

* * * * *